Dec. 1, 1970  N. STORM  3,544,128
SUPPORT TRAILER
Filed Nov. 12, 1968  2 Sheets-Sheet 1

INVENTOR
NELSON STORM
BY Fred L. Witherspoon, Jr.
ATTORNEY

Dec. 1, 1970   N. STORM   3,544,128
SUPPORT TRAILER
Filed Nov. 12, 1968   2 Sheets-Sheet 2
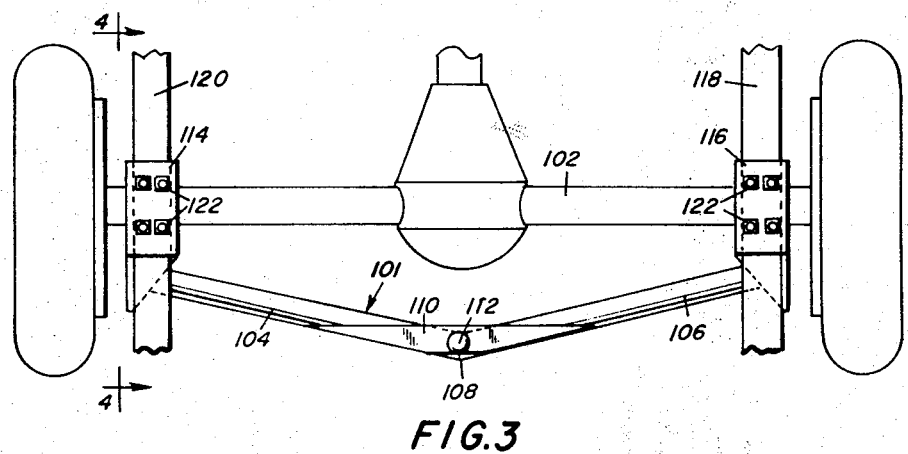
FIG.3
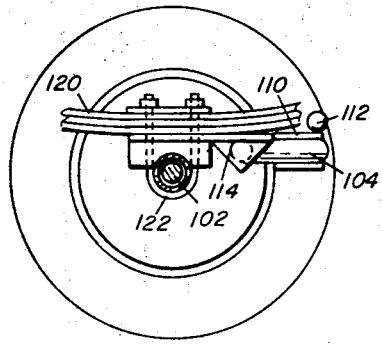
FIG.4
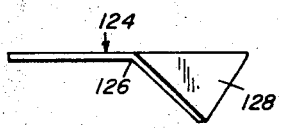
FIG.5
FIG.6
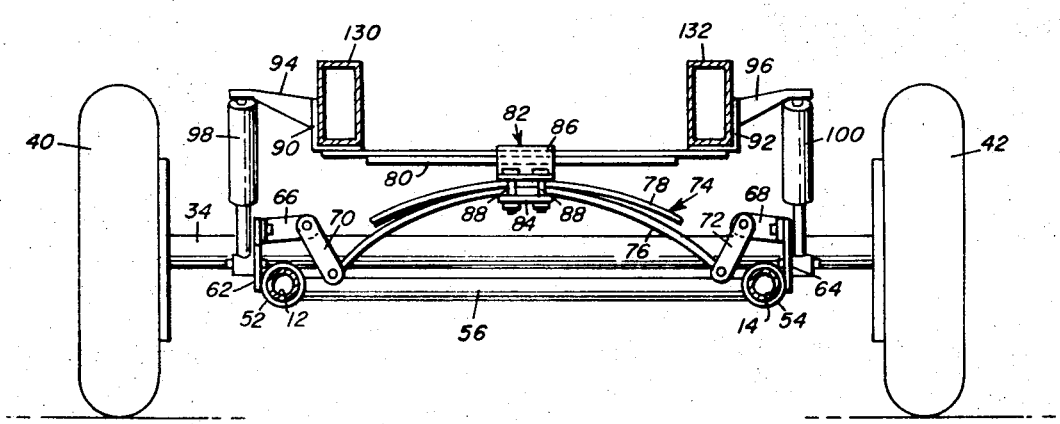
FIG.7
INVENTOR
NELSON STORM
BY *Fred L. Witherspoon, Jr.*
ATTORNEY

United States Patent Office 3,544,128
Patented Dec. 1, 1970

3,544,128
SUPPORT TRAILER
Nelson Storm, 213 Perry, Rossville, Ill. 60963
Filed Nov. 12, 1968, Ser. No. 774,710
Int. Cl. B62d *53/04*
U.S. Cl. 280—81                    6 Claims

ABSTRACT OF THE DISCLOSURE

A support trailer for use with a conventional pickup truck to provide additional load carrying capacity and stabilization to the vehicle, said support trailer including a main frame assembly mounting, a pair of wheels with a subframe slidably mounted on said main frame, said subframe having means thereon for securement to the truck frame aft of the truck rear axle housing.

BACKGROUND OF THE INVENTION

This invention is particularly useful on the conventional type pick-up truck where there is a substantial overhang extending rearwardly of the rear axle. It is common practice to heavily load such trucks and when a substantial portion of the load is aft of the rear axle stability problems arise. As would be expected, there is a tendency for the vehicle to rise in the front and drop down in the rear due to such loading. With the truck in such position steering is impaired and the rear springs are overloaded and will bottom-out. This uneven loading can also put undue strain on the tires and possibly cause blowouts.

It is with these problems in mind that the support trailer of this invention has been devised.

SUMMARY OF THE INVENTION

It is an object of this invention to provide a support trailer adapted to fit aft of the rear axle of a pickup truck to furnish additional support at the rear of the truck.

It is another object of this invention to provide a support trailer which is adjustable so that it will accommodate various types and sizes of trucks wherein there is a need for additional support aft of the rear axle.

It is yet another object to provide a support trailer comprising a main frame assembly mounting, a pair of wheels and a subframe assembly slidably carried on said main frame assembly with means on the subframe assembly to secure it to the truck frame and means on the main frame to hitch it to the truck.

BRIEF DESCRIPTION OF DRAWINGS

FIG. 3 is a top plan view of the rear portion of a vehicle showing the hitch assembly to which the support trailer is connected;

FIG. 4 is a cross-sectional view taken along line 4—4 of FIG. 3 showing details of the hitch;

FIG. 5 is a plan view of the hitch mounting bracket before it is formed by bending;

FIG. 6 is an elevational view of the bracket of FIG. 5 after the corner portion has been bent down 90°, and FIG. 7 is a cross-sectional view taken along line 7—7 of FIG. 2 showing the manner in which the support trailer is secured to the truck frame.

Figure 1:
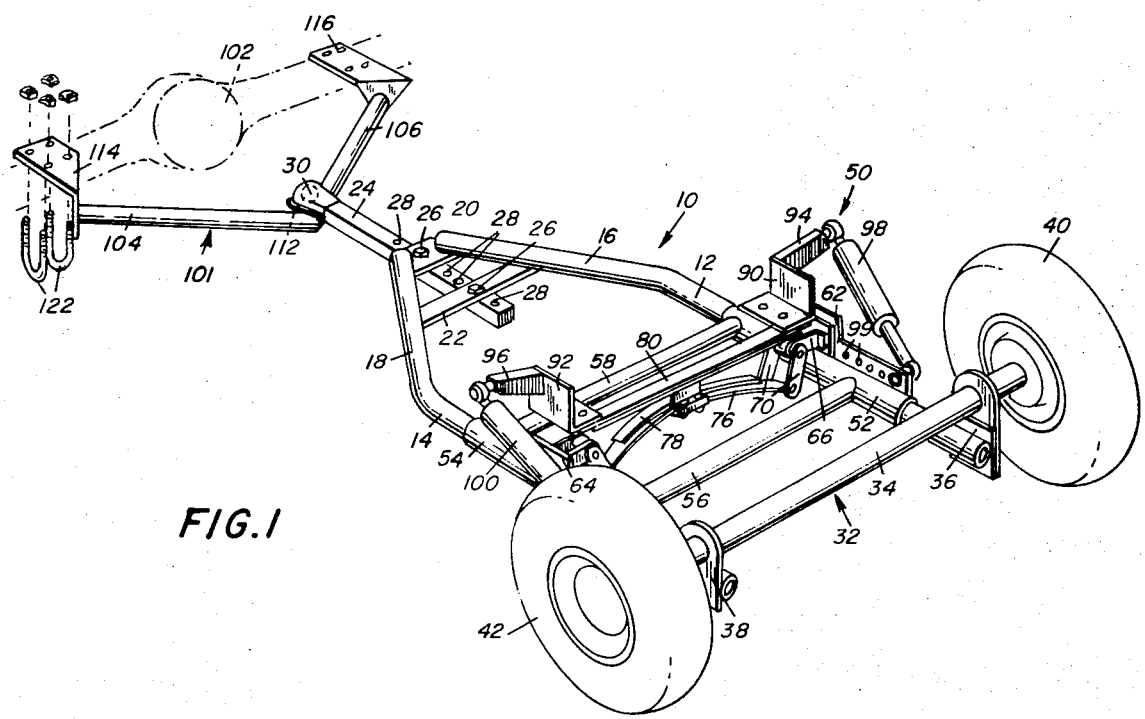
FIG. 1 is a perspective view of the support trailer of this invention illustrating its attachment to a hitch aft of the rear axle of a vehicle.
Figure 2:
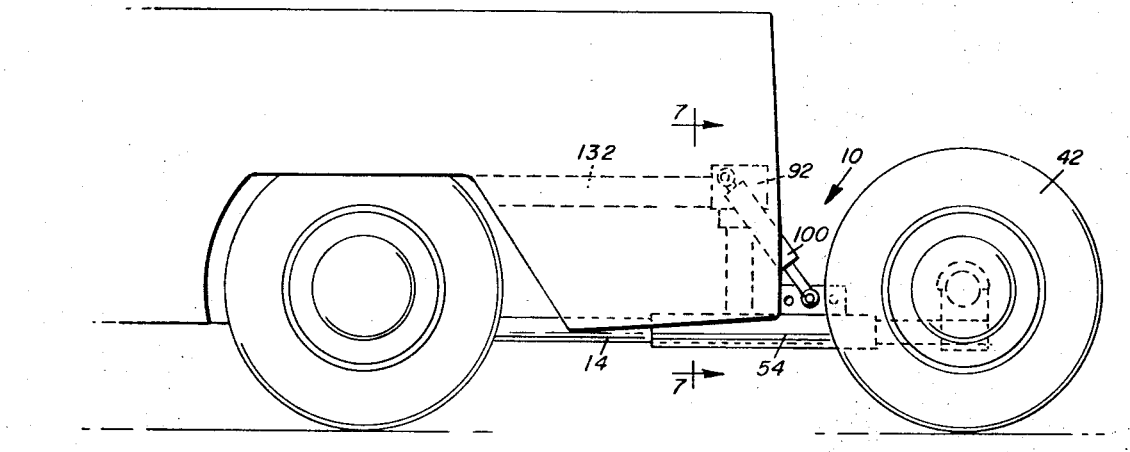
FIG. 2 is a side elevational view showing the support trailer hitched to the truck.

As illustrated in the various figures of the drawings, the support trailer of this invention comprises a main frame assembly 10 including a pair of spaced parallel side members 12 and 14 in the form of tubes having inwardly directed forward end portions 16 and 18 secured at their ends by means of a main frame plate 20 to form a rigid forward end section. An additional cross brace 22 is secured between the side member portions 16 and 18 for additional strength and rigidity. A tongue member 24 is adjustably carried by the plate 20 and cross brace 22 by means of bolts 26. Additional holes 28 in the tongue member 24 make longitudinal adjustment possible. In the particular embodiment illustrated, the tongue 24 is provided with a female portion 30 of a conventional ball and socket connection.

The main frame assembly 10 is provided with an axle assembly 32 between and across the rearward portions of main frame side members 12 and 14. This axle assembly includes a transversely extending axle housing 34 affixed to the side members 12 and 14 by means of bracket assemblies 36 and 38. Wheels 40 and 42 are mounted on the axle assembly 32 outward of the side frame members 12 and 14.

A subframe assembly 50 is slidably mounted on the main frame assembly 10 and comprises a pair of longitudinal subframe members 52 and 54 in the form of tubes which fit around main frame side members 12 and 14, respectively, for back and forth sliding movement therealong. A pair of subframe cross braces 56 and 58 are connected to the subframe side members 52 and 54 to furnish required rigidity. Mounting plates 62 and 64 are provided on subframe side members 52 and 54, respectively, and have U-shaped brackets 66 and 68 affixed thereto. These U-shaped brackets 66 and 68 extend inwardly toward each other and each pivotally mounts a pair of parallel links 70—70 and 72—72 respectively. A leaf spring assembly 74 which is bowed upwardly is mounted between the free ends of link pairs 70—70 and 72—72. This leaf spring assembly 74 as shown includes a main curved spring 76 and a secondary booster leaf 78.

A transversely extending subframe bar 80 is centrally secured to upper portion of the spring assembly 74 by means of a bracket assembly 82 which includes a flat plate 84 positioned beneath the spring 76 at its upper central portion and a flanged U-shaped bracket 86 welded or otherwise affixed to bar 80. Bolt and nut assemblies 88 are employed to retain the plate 84 and flanged U-shaped bracket 86 in assembled position with the leaf spring assembly 74 and the bar 80 held in proper relation thereby. Right angle brackets 90 and 92 are secured to the upper end portions of the transverse subframe bar 80 and have shock absorber supporting arms 94 and 96 secured respectively thereto outwardly from the upper leg of each angle bracket 90 and 92. A shock absorber 98 is adjustably mounted between supporting arm 94 and the upper portion of bracket 62. It should be noted that bracket 62 has a plurality of holes 99 to provide required adjustability of mounting. Similarly, shock absorber 100 is mounted between supporting arm 96 and bracket 64 which is likewise apertured for purposes of adjustability.

As previously set forth, the support trailer of this invention is particularly well adapted for use in connection with a conventional pickup truck. The support trailer is hitched to the truck by means of a hitch aft of the axle housing and by securement of the subframe assembly to the truck frame as follows. As best shown in FIGS. 1, 3 and 4, the pickup truck has a ball-and-socket type hitch 101 arranged aft of its rear axle housing 102. The hitch comprises a pair of converging struts 104 and 106 connected at their meeting point 108. An additional cross brace 110 is secured across this point 108 and mounts a ball 112 of a ball and socket hitch unit.

In order to mount the ball and socket hitch assembly 101 on the truck, a pair of mounting brackets 114 and 116 are secured to the truck leaf springs 118 and 120 by means of U-bolts and nuts 122 as in FIG. 4. Each of the mounting brackets 114 and 116 is formed from a flat plate 124 which is bent downwardly along line 126 to form a depending flange 128. As shown in FIG. 6, the mounting plate so formed will be the same as mounting plate 16 of FIGS. 1 and 3. Bending of the flange 128 oppositely would produce the mounting plate 114. The depending flanges of mounting plates 114 and 116 support the free ends of struts 104 and 106 which are welded thereto as best shown in FIG. 1.

The truck is provided with a pair of parallel box frame members 130 and 132 running lengthwise of the truck as shown in cross section in FIG. 7. These frame members are adapted to receive the subframe right angle brackets 90 and 92, respectively, and are affixed to each other by means of bolt and nut assemblies or any other suitable means.

In using the support trailer of this invention, the entire unit is moved under the rear portion of the truck so that the ball 112 on the hitch may be connected to the socket 30 on the main frame tongue 24. With this connection made, the right angle subframe brackets 90 and 92 are brought into engagement with and secured respectively to box frame members 130 and 132. Thus the unit is secured to the truck and ready for use. It will thus be apparent that the support trailer main frame is secured to the truck by means of the hitch assembly 101, while the subframe assembly 50 is secured to the truck body frame members 130 and 132. Since the subframe assembly 50 is slidable on the main frame, it is obvious that the entire unit is adjustable and accommodates a wide range of vehicle sizes.

It should be noted that there is sufficient flexibility in the leaf spring supporting arrangement to make the support trailer follow or track in the desired manner.

Having thus described the invention, what is claimed is:

1. A support trailer for use with a conventional pickup truck wherein the truck has a trailer hitch aft of its rear axle housing and also has a frame extending rearwardly of the rear axle housing, said support trailer comprising a main frame assembly, a pair of wheels mounted thereon, a subframe assembly slidably mounted on the main frame, for free movement thereon at all times, means on said subframe assembly adapted to flexibly secure the subframe assembly to the truck frame aft of the rear axle housing of the truck and means on the main frame assembly adapted to secure the main frame assembly to the trailer hitch.

2. The invention as described in claim 1 and wherein the main frame assembly comprises a pair of parallel side members rigidly connected at their forward end and a wheel mounting axle assembly secured across the rearward ends of the side members.

3. The invention as described in claim 2 and wherein the subframe assembly comprises a pair of longitudinal subframe members slidably mounted on the main frame side members, and a leaf spring assembly transversely mounted between the longitudinal subframe members.

4. The invention as described in claim 3 and wherein the shock absorbing means is connected between the leaf spring assembly and the subframe longitudinal members.

5. The invention as described in claim 4 and wherein the means on the main frame assembly adapted to secure the main frame assembly to the trailer hitch comprises a longitudinally adjustable tongue mounted at the forward end of the main frame.

6. A support trailer for use with a conventional pickup truck or the like wherein the truck has a trailer hitch secured aft of its axle housing and also has a pair of longitudinal truck frame members extending rearwardly beyond the rear axle, said support trailer comprising a main frame, said main frame having a pair of spaced parallel longitudinally extending side members, said side members having inwardly directed forward end portions, means securing these end portions in fixed position to form the forward end of the main frame, a tongue member adjustably mounted on the forward end of the main frame, said tongue having means therein adapted to detachably engage the truck trailer hitch mounted aft of the axle housing, an axle assembly secured across the rear end portions of the side members, wheels mounted on the axle assembly outwardly of the side members, a subframe assembly movably mounted on the main frame, said subframe assembly comprising a pair of longitudinal subframe members slidably mounted on the main frame side members for movement therealong, cross brace means connecting the pair of subframe members, side bracket means secured to each subframe side member, an upwardly curved leaf spring assembly mounted by and between the aforesaid side bracket means transversely of the subframe members, a truck frame engaging beam secured to the upper curved portion of the leaf spring and adapted to be secured to the pair of rearwardly extending truck frame members, a shock absorber mounted between and connected to each side bracket means and its adjacent end of the truck frame engaging beam.

References Cited

UNITED STATES PATENTS

| | | | |
|---|---|---|---|
| 1,366,771 | 1/1921 | Devencenzi | 296—26 |
| 2,919,928 | 1/1960 | Hoffer | 280—81 |
| 2,925,135 | 2/1960 | Hamilton | 280—474XR |
| 2,982,563 | 5/1961 | Gregg | 280—81 |
| 3,154,324 | 10/1964 | Symes | 280—414 |
| 3,282,601 | 11/1966 | Harbers | 280—81 |

LEO FRIAGLIA, Primary Examiner

L. J. PAPERNER, Assistant Examiner

U.S. Cl. X.R.

280—400